United States Patent [19]

Haas, Sr. et al.

[11] 4,308,790
[45] Jan. 5, 1982

[54] BAKING TONGS

[76] Inventors: Franz Haas, Sr., Gerstlgasse 25, 1210 Wien; Franz Haas, Jr., Castellezgasse 32, 1020 Wien; Johann Haas, Wiener Strasse 209-215, 2104 Spillern (Nö), all of Austria

[21] Appl. No.: 112,132

[22] Filed: Jan. 14, 1980

[30] Foreign Application Priority Data

Jan. 15, 1979 [AT] Austria .................................. 269/79

[51] Int. Cl.³ .............................................. A47J 37/00
[52] U.S. Cl. ...................................................... 99/380
[58] Field of Search ................. 99/372, 373, 374, 375, 99/376, 377, 378, 379, 380, 381, 382, 383, 384, 422, 426, 428, 439

[56] References Cited

U.S. PATENT DOCUMENTS 2207264  7/1940  Neuberger ........................... 99/373

FOREIGN PATENT DOCUMENTS 163753  9/1904  Fed. Rep. of Germany ........ 99/372

*Primary Examiner*—Billy J. Wilhite
*Attorney, Agent, or Firm*—Schwartz, Jeffery, Schwaab, Mack, Blumenthal & Koch

[57] ABSTRACT

A baking press or baking tongs having a pair of baking plates which are clamped together with dough treating sides facing each other. The baking tongs produce sheets of wafers from a filling of dough disposed between the dough treating sides when the baking plates are in a heated condition. One or more of the dough treating sides are convexly cambered into a space between the dough treating sides of the pair of clamped baking plates.

13 Claims, 7 Drawing Figures

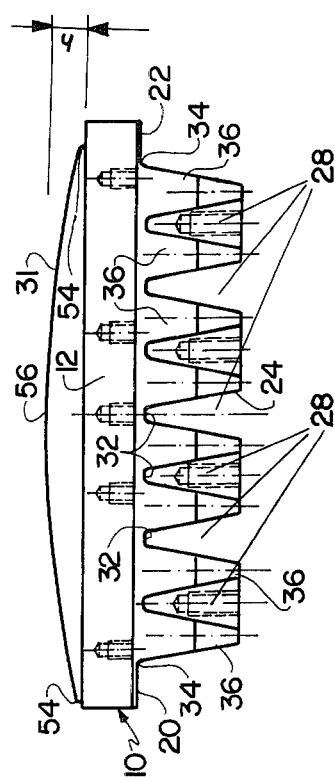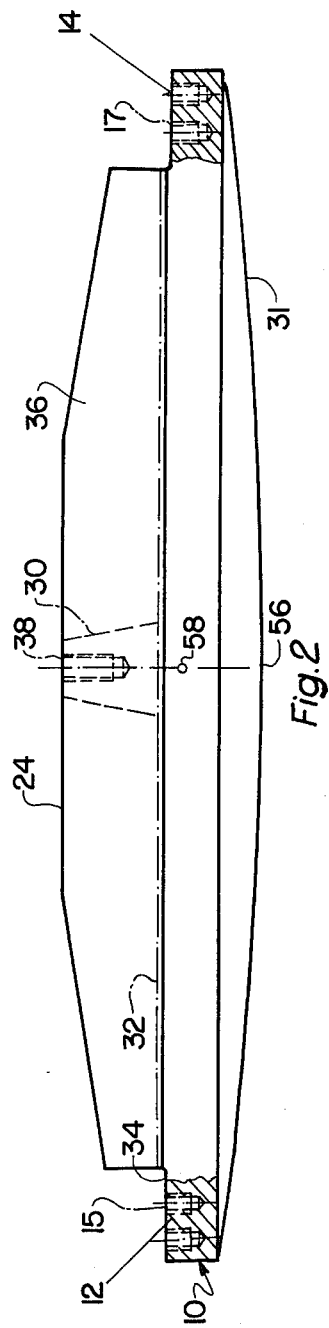

BAKING TONGS

TECHNICAL FIELD OF THE DISCLOSURE

The invention concerns baking tongs, baking presses, baking clamps, or baking molds for the production of sheets of wafers, preferably in automatic baking machines, wherein heated baking plates, clamped together in pairs with their dough treating sides facing each other and including a filling of dough in the space between said treating surfaces, are passed through an oven space.

DESCRIPTION OF THE PRIOR ART

Known baking tongs of this type make it possible to produce sheets of wafers of a maximum size of about 350×480 mm. Industry desires, however, to produce large sheets of wafers in order both to reduce the cost of personnel required to operate the machine per package of slices and also to reduce the proportion of waste encountered during the cutting of blocks of wafers into slices. Attempts to produce larger wafer sheets have heretofore been unsuccessful for reasons which will now be discussed.

When the baking plates are designed so that the sheets of wafers are of the same thickness in the center as at the edges and an effort is made to produce larger wafer sheets, the baking plates and the supporting stands which are always required become heavy enough so that any cost advantage of the larger wafer sheets would be eliminated by the high initial cost of the baking machines equipped with baking tongs of this type. When the thickness of the plate or of the necessary supporting stand, respectively, is reduced to an economically justifiable value, the baking plates are bent by the vapor pressure generated therebetween during baking, so that the wafer sheet will be substantially thicker in the center than at the edges. In a multiple layer wafer block these differences in thickness add up, so that a slice cut from the edge of a wafer block will either be substantially lighter than a slice cut from the center of the same block, or a slice cut from the center will contain significantly less of the filling material, such as a cream filling. Such differences between slices are unacceptable for reasons of quality. For the same reasons, the increase in thickness of a wafer sheet toward its center should amount to a maximum of 0.1 mm.

A further reason why it has heretofore been impossible to economically produce acceptable sheets of wafers larger than 350–480 mm is because adequate degassing of the wafer dough during the baking process could not be obtained. Because of the larger distances of the steam ridges from the center of the baking plates, the vapors have been unable to escape to a sufficient degree, thus leading to increased deformation of the baking plates. Such deformation is also a significant cause of inadequate degassing of the dough in the center of the baking tongs. This is because, in the center, the volume of dough to be baked is larger than at the edges. Therefore, the baking time will also be longer in the center. The dough located near the edges, however, is baked much more rapidly because of its lesser thickness and because of its better degassing ability due to the proximity of the steam ridges. This leads to a situation where the dough in the center of the tongs can no longer be degassed. Therefore the sheet of wafers either: (1) is insufficiently baked in the center of the tongs or (2) exhibits defects or very thin places due to steam bubbles. Such a sheet of wafers is useless.

SUMMARY

It is an object of the invention to provide baking tongs having a weight that is economically justifiable in relation to the size of the sheet of wafers produced and to make possible the production of sheets of wafers with a size of 400×800 mm, preferably, for example, 325×650 mm, having the same thickness and homogeneity in the center as at the edges. This object is attained, in keeping with the invention, by the fact that in the unfilled state the distance between the dough treating sides of the opposed baking plates in the geometric center of the area of each dough treating side is shorter than at the edges and that such distance continuously increases at least in one direction from the inside toward the outside of the space between the baking plates. According to a preferred embodiment of the invention, the dough treating side of at least one of the baking plates is cambered convexly into the space between the plates in at least one direction along the baking plate. Advantageously, the difference of the distance between the dough treating sides of the baking plates taken at the centers thereof and the distances between the dough treating surfaces taken at the edges thereof is a value equal to 0.003 to 0.00003 times and preferably 0.001 to 0.0001 times the length of a baking plate. This value or difference constitutes the combined extent of the camber of the two plates. It will be understood in this regard that the camber of each dough treating side between the center and edge thereof may be with respect to only a portion of the edge. Thus, where "edge" or "edges" of the dough treating sides are referred to herein, what is meant is at least a portion of the edge or at least certain portions of the edges.

The invention is based on the finding that the enormous vapor pressures, on the one hand, and poor quality of the wafer sheet (i.e. inadequate baking of the wafer in the center area) on the other are due mainly to the deformation of the baking plates in the centers thereof, i.e. a larger distance of the dough treating surfaces of the baking plates from each other in the centers thereof than at the edges thereof. A baking plate with dimensions of 350×480 mm and a weight of approximately 50 kg undergoes a deflection of approximately 0.05 mm during the baking process. If, on the other hand, it is assured that the distance of the dough treating sides in the centers of the baking plates from each other is never greater and is preferably even smaller by 1/10 mm than at the edges of the baking plates, in spite of the vapor pressures occurring, then the wafer sheet bakes completely at first in the center and the steam generated thereby escapes through the dough that is still liquid near the edges. This further reduces the maximum vapor pressures occurring in the baking tongs, and the baking tongs may therefore be made lighter.

By means of the cambering of the dough treating side of the baking plate in a direction opposite the direction in which it deflects by the pressure of the vapor, the deflection is equalized. Thus, compensation for the deflection does not add to the weight of the device and there is no increased thickness. There are at least two ways to make the baking tongs according to the invention.

The first involves designing the baking plate, not with a flat dough treating side as known and expected, but with a cambered dough treating side. This may be effected by prestressing the baking plate during the machining of the dough treating side and then providing the baking plate with the known planar dough treating surface. By virtue of the prestressing, less material is removed in the center than at the edges. At the completion of the processing of the dough treating side, the prestress of the baking plate is relieved. The baking plate then assumes its original shape, and the dough treating side, which has been planar, becomes cambered. With this mode of manufacturing, a slight accumulation of material takes place automatically in the center of the baking plate, contributing, at the onset of the baking process, to a more rapid degassing of the dough in the center of the baking tongs.

The second possibility for carrying out the manufacture of the baking plates involves replacing the flat grinding of the baking plate with camber grinding. This, however, requires special grinding machines.

The best results are obtained when both baking plates are provided with a truncated spherical dough treating side. This, however, considerably increases the cost of manufacture. Two baking plates may be made with cambers having maximum heights of between 0.003 and 0.00003 and preferably only between 0.0015 and 0.0001 times the length of the longitudinal side of the baking plate.

It is therefore advisable to provide only one of the two baking plates with a truncated spherical dough treating side, but with twice the camber. Thus, the increase in cost, compared with the cost of flat baking plates of the same size, is reduced by half.

It is also economical, however, to camber one of the two baking plates of a set of baking tongs in only the longitudinal direction and to camber the other of the baking plates only in the transverse direction. Thus, the production costs compared to those of planar baking plates are limited to the higher cost of two cambered grinding disks versus the cost of a single flat grinding disk. Both the prestressing of the baking plates and the use of special grinding machines are eliminated.

The invention is explained in more detail hereinbelow with the aid of an example or embodiment represented in the drawing.

BRIEF DESCRIPTION OF THE DRAWINGS

FIG. 2 is a side elevation of the longitudinal side of the baking plate according to FIG. 1. with partial sections on lines A—A and B—B of FIG. 1.

FIG. 3 is a side elevation of the narrow side of the baking plate according to FIG. 1.

DETAILED DESCRIPTION OF THE PREFERRED EMBODIMENT

Figure 1:
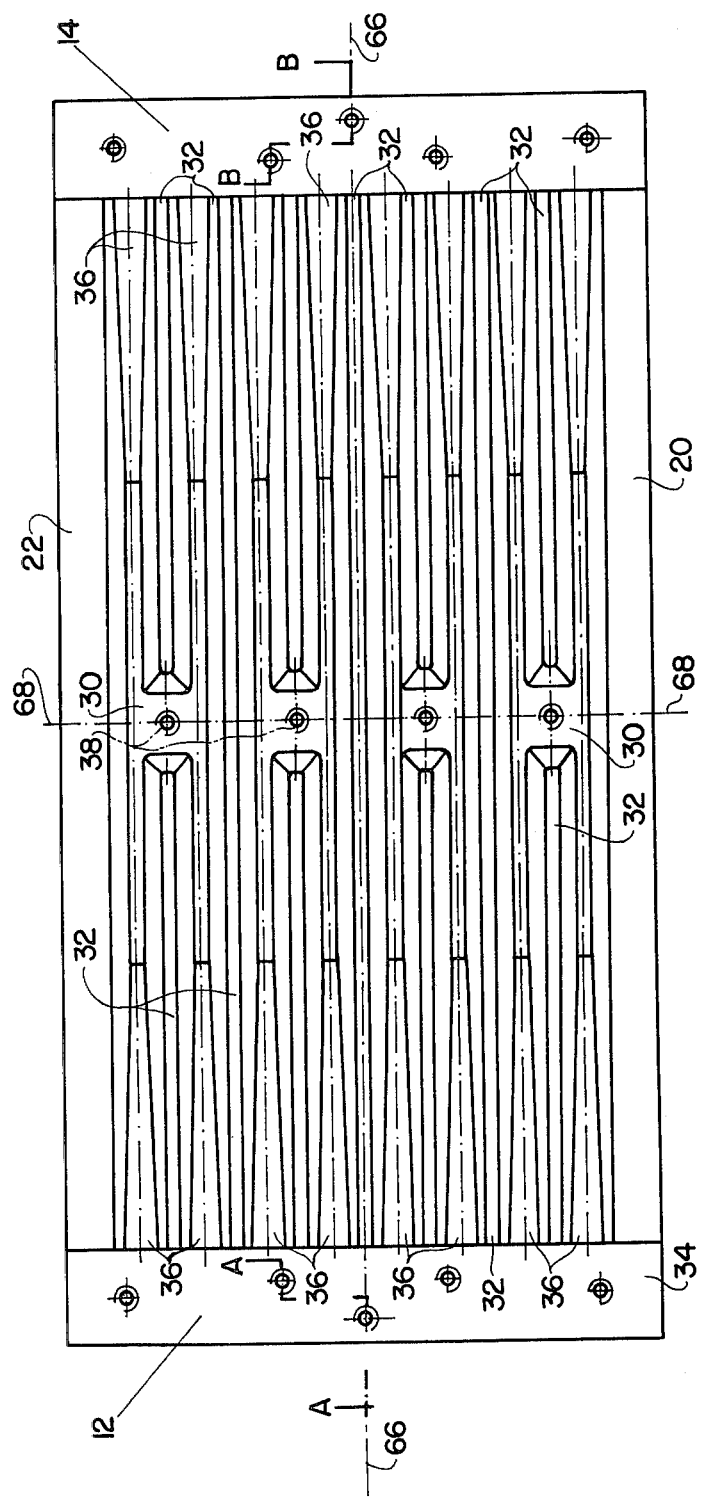
FIG. 1 is a plan view of the heat treating side of a baking plate for baking tongs according to the invention, the heat treating side being the side opposite the dough treating side.

FIGS. 1-3 of the drawing show a self-supporting baking plate 10, stepped down at narrow sides 12, 14 only. One narrow side 12 is fastened via holes 15 to a hinge part 16 (FIG. 4) and the other narrow side 14 is fastened via holes 17 to a locking part 18 of baking tongs 19. As seen in FIG. 3, the baking plate 10 is also stepped on long sides 20, 22. The rest of heat treating side 24 increases in height from the narrow sides 12, 14 toward the center 26 and is provided with eight recesses 28 (four of which are divided in half by a transverse center web 30) extending in the longitudinal direction and narrowing toward the dough treating side 31. The bottoms 32 of said recesses coincide approximately with the upper edges 34 of the stepped down narrow sides 12, 14. The cross sectional profiles of the recesses 28 correspond approximately with the cross sectional profiles of ribs 36 bounding the recesses 28.

As seen in FIG. 1, each two adjacent ribs 36 are connected by means of the wide transverse web 30, which is primarily for the purpose of receiving bolts in holes 38 for the prestressing of the baking plate during machining.

In FIGS. 1-3, 6 and 7 of the drawing, the baking plate 10 is represented in the unstressed state. The extent "h" of the chamber of both baking plates together in a set of baking tongs 19 is controlled so that the sheet of wafers 40 produced in these baking plates is thinner by approximately 1/10 mm in the center than at the edges. It will be readily apparent that the extent "h" of the camber of the baking plates 10 is exaggerated in the drawing for purposes of illustration.

Figure 7:
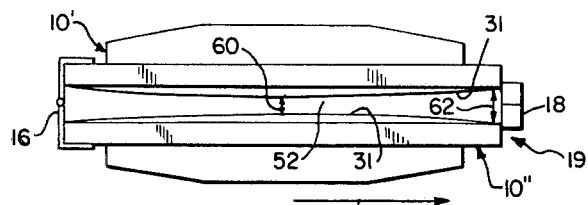
FIG. 7 is a side elevation similar to FIG. 4 in which the baking tongs are in an unfilled, clamped condition.
Figure 4:
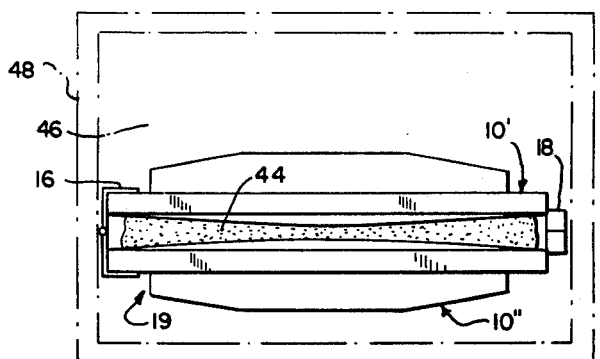
FIG. 4 is a side elevation of the longitudinal side of the baking tongs of the present invention in a clamped and filled condition.
Figure 5:
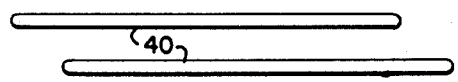
FIG. 5 is a side elevation showing baked wafer sheets.
Figure 6:
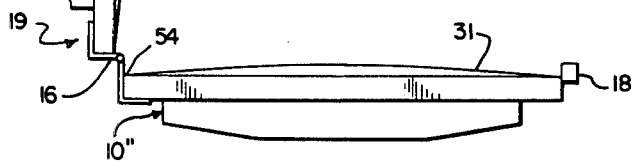
FIG. 6 is a side elevation similar to FIG. 4 in which the baking tongs are in an unclamped, unfilled condition.

FIGS. 4, 6 and 7 illustrate the baking tongs 19 of the present invention. Baking tongs 19 include an upper baking plate 10' and a lower baking plate 10" coupled together by hinge part 16 at one narrow side 12 and locking part 18 at the other narrow side 14. Baking tongs 19 hold a filling of dough 44 which is baked in a baking oven space 46 of an automatic baking machine 48 at a baking temperature to produce sheets of wafers 40 (FIG. 5). Baking plates 10', 10" cooperate with each other for movement between a clamped and filled condition (FIG. 4) and an unclamped condition (FIG. 6).

In the clamped and filled condition of FIG. 5, the baking plates 10', 10" are heated and held together and dough treating sides 31 are thus in generally face-to-face spaced relationship at a certain distance from each other so as to define a space 52 (FIG. 7) therebetween. The filling of dough to be baked 44 is disposed in space 52 between dough treating sides 31.

The unclamped condition is shown in FIG. 6. There, the baking plates 10, 10' have been moved apart for removal of baked wafer sheets 40 and entry of new dough to be baked.

The baking plates are also capable of assuming an unfilled, clamped condition as shown in FIG. 7. This condition is illustrated and described primarily to show and define certain structural and dimensional characteristics of the baking tongs 19 and to set forth certain relationships of elements rather than to show a working condition of the baking tongs 19. In the unfilled, clamped condition, the baking plates 10', 10" are generally in the same position as in the clamped and filled condition of FIG. 4, but they are not acted upon by a filling of dough 44 which is subject to the heat of the baking plates.

Each baking plate 10', 10" is defined by an edge 54 which borders each plate. Each dough treating side 31 has a geometric center 56 within the area bounded by edge 54. Preferably, each baking plate 10', 10" is symmetrical in its weight distribution so that geometric center 56 is at the same longitudinal position along each baking plate 10 as the center of gravity 58 of each baking plate.

As indicated above, the distance 60 between the dough treating sides 31 of the pair of baking plates 10', 10" in the unfilled, clamped condition of FIG. 7 is smaller at the centers 56 of the dough treating sides than the distance 62 therebetween at the edges 54 (or at least certain portions of the edges 54). This distance between dough treating sides increases in at least one direction 64 from the centers 56 to the edges 54.

When baking plates 10', 10" are in the clamped and filled condition, (FIG. 4) and when they are at the baking temperature, the distance 60 between the dough treating sides 31 at the centers 56 is equal to or less than the distance 62 taken at the edges 54 (or at least at certain portions of edges 54). Preferably, however, when the baking plates are in this clamped and filled condition and at the baking temperature, distance 60 is less than distance 62 by an amount which is between 0.2 and 0.003 times distance 62.

As will be apparent from FIG. 1, each baking plate 10 is elongated and has a longitudinal axis 66 and a transverse axis 68. As indicated earlier, one dough treating side 31 may be cambered about the longitudinal axis 66 or about the transverse axis 68. Also one dough treating side 31 may be cambered about the longitudinal axis 66 while the other mating dough treating side is cambered about the transverse axis 68. In that case, the extent of camber of the one dough treating side about the longitudinal axis 66 (i.e. the value of height h of FIG. 3) is greater than the extent of camber of the other mating dough treating side about the transverse axis 68.

The baking plate 10 of the present invention is further characterized by favorable heat transfer characteristics, because the flames and the flue gases from the oven space are able to act on the heat treating side of the baking plate without the interference of vortices.

The following are cited as examples of baked goods produced by sets of baking tongs 19 according to the invention:

1. A host baked between two smooth baking plates with a total thickness of approximately 0.6 to 0.8 mm;

2. A sheet of wafers with fine engraving. The sheet has a total thickness of approximately 2.7 mm and a core thickness of approximately 1.5 mm. It is baked between two baking plates, one with engraving approximately 0.8 mm deep and the other with engraving approximately 0.4 mm deep;

3. A sheet of wafers with coarse engraving. The sheet has a core thickness of approximately 1.5 mm and is baked between two baking plates one with engraving approximately 4 mm deep and the other with an engraving depth of approximately 1 mm.

4. Hollow wafers with a total height of the wafer body of up to 30 mm and a core thickness of the wafer body of approximately 2 mm to 3 mm; both plates possibly including fine engraving.

It should be understood that the above-cited examples do not constitute limitations of the invention. Thus, for instance, deviations in the depth of the engraving or the thickness of the wafers are of course possible. Of course, too, both engraved plates and plates without engraving may be used without departing from the spirit and scope of the invention.

What is claimed is:

1. Baking tongs for holding a filling of dough which is baked in a baking oven space at a baking temperature to produce sheets of wafers, the baking tongs comprising:

(a) a pair of baking plates each having a dough treating side, said baking plates cooperating with each other for movement between
a clamped and filled condition in which said baking plates are heated and held together so that said dough treating sides are in generally face-to-face spaced relationship at a certain distance from each other so as to define a space therebetween, the filling of dough to be baked being disposed in said space between said dough treating sides; and
an unclamped condition in which said baking plates have been moved apart for removal of baked wafer sheets and entry of new dough to be baked;
said baking plates also being capable of assuming an unfilled, clamped condition in which said baking plates are generally in the same position as in said clamped and filled condition but are not acted upon by a filling of dough subject to the heat of the baking plates;

(b) each dough treating side being defined by an edge which borders each such dough treating side, each dough treating side having a geometric center within the area bounded by said edge;

(c) the distance between said dough treating sides of said pair of baking plates in said unfilled, clamped condition thereof being smaller at said centers of said baking plates than at at least certain portions of said edges, said distance between dough treating sides increasing in at least one direction from said centers to said edges; and (d) the distance between said dough treating sides at said centers, when said baking plates are in said clamped and filled condition and when they are at the baking temperature, being equal to or less than the same distance taken at at least certain portions of said edges.

2. Baking tongs as defined in claim 1 wherein the distance between said dough treating sides at said centers, when said baking plates are in the clamped and filled condition and when they are at the baking temperature, is less than the same distance taken at at least certain portions of said edges by an amount which is between 0.2 and 0.003 times the distance taken at said certain portions of said edges.

3. Baking tongs as defined in claim 1 wherein the distance between the dough treating sides in said unfilled, clamped condition increases from said centers toward said edges of said plates in two mutually perpendicular directions.

4. Baking tongs as defined in claim 3 wherein the dough treating side of at least one of the baking plates is cambered convexly into said space between said dough treating surfaces in at least one direction along the baking plate.

5. Baking tongs as defined in claim 4 wherein each baking plate is elongated and has a longitudinal axis and a transverse axis and wherein the dough treating side of said one baking plate is cambered around its transverse axis.

6. Baking tongs as defined in claim 4 wherein each baking plate is elongated and has a longitudinal axis and a transverse axis and wherein the dough treating side of said one baking plate is cambered around its longitudinal axis.

7. Baking tongs as defined in claim 3 wherein the dough treating side of at least one of said baking plates has a truncated spherical configuration.

8. Baking tongs as defined in claim 7 wherein said dough treating sides of both baking plates of said pair have truncated spherical configurations.

9. Baking tongs as defined in claim 1 wherein said dough treating sides of both baking plates of said pair are each cambered convexly into said space between said dough treating surfaces in at least one direction along said baking plates.

10. Baking tongs as defined in any one of claims 1, 2, 3, 4 or 9 wherein each baking plate is elongated and has a longitudinal axis and transverse axis and wherein the dough treating side of one of said baking plates is cambered about its longitudinal axis and the dough treating side of the other of said baking plates is cambered about its transverse axis.

11. Baking tongs as defined in claim 10 wherein the extent of camber of the dough treating side of said one baking plate about its longitudinal axis is greater than the extent of camber of the dough treating side of said baking plate about its transverse axis.

12. Baking tongs as defined in claim 8 or 9 wherein said baking plates are elongated and wherein the difference of the distance between said dough treating surfaces at said certain portions of said edges and the distance between said dough treating surfaces at said centers when in said clamped and unfilled condition is a value equal to 0.003 to 0.00003 condition is a value equal to 0.003 to 0.00003 times the length of one of said baking plates, said difference constituting the extent of camber of both baking plates of said pair together.

13. Baking tongs as defined in claim 12 wherein said differencewhich constitutes the extent of camber of both baking plates of said pair together is a value equal to between 0.0015 and 0.0001 times the length of one of said baking plates.

* * * * *